United States Patent
King et al.

(10) Patent No.: US 7,203,811 B2
(45) Date of Patent: Apr. 10, 2007

(54) NON-FENCED LIST DMA COMMAND MECHANISM

(75) Inventors: Matthew Edward King, Pflugerville, TX (US); Peichum Peter Liu, Austin, TX (US); David Mui, Round Rock, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/631,542

(22) Filed: Jul. 31, 2003

(65) Prior Publication Data

US 2005/0027903 A1 Feb. 3, 2005

(51) Int. Cl.
*G00F 13/28* (2006.01)

(52) U.S. Cl. .......................... 711/169; 710/22; 710/24; 710/308

(58) Field of Classification Search .................. 710/24; 711/169
See application file for complete search history.

(56) References Cited

U.S. PATENT DOCUMENTS

| | | | |
|---|---|---|---|
| 5,619,723 A * | 4/1997 | Jones et al. .................... 710/3 |
| 6,076,158 A * | 6/2000 | Sites et al. .................... 712/230 |
| 6,427,201 B1 * | 7/2002 | Ohba .......................... 712/22 |
| 2004/0187122 A1 * | 9/2004 | Gosalia et al. .............. 718/100 |
| 2004/0187135 A1 * | 9/2004 | Pronovost et al. .......... 718/104 |

* cited by examiner

*Primary Examiner*—Kim Huynh
*Assistant Examiner*—Niketa I. Patel
(74) *Attorney, Agent, or Firm*—Carr LLP; Diana R. Gerhardt

(57) ABSTRACT

A method and an apparatus are provided for handling a list DMA command in a computer system. The list DMA command relates to an effective address (EA) of a system memory. At least one processor in the system has a local storage. The list DMA command is queued in a DMA queue (DMAQ). A list element is fetched from the local storage to the DMAQ. The list DMA command is read from the DMAQ. A bus request is issued for the list element. If the bus request is a last request, it is determined whether a current list element is a last list element. If the current list element is not the last list element, it is determined whether the current list element is fenced. If the current list element is not fenced, a next list element is fetched regardless of whether all outstanding requests are completed.

18 Claims, 2 Drawing Sheets

NON-FENCED LIST DMA COMMAND MECHANISM

BACKGROUND OF THE INVENTION

1. Field of the Invention

The invention relates generally to a direct memory access (DMA) mechanism in a computer system and, more particularly, to a non-fenced list DMA command mechanism.

2. Description of the Related Art

In a modern computer system, a direct memory access (DMA) mechanism may be used to handle data transfers between a system memory and a device (e.g., a memory mapped I/O, a hard disk or an I/O device) without interrupting a processor of the computer system with the details of the data transfer process. Typically, a direct memory access controller (DMAC) coupled to the processor receives one or more DMA commands from the processor. And the DMAC "unrolls" each DMA command into one or more transfer requests, which are then sent to a bus of the computer system. It is important to optimize the process of fetching DMA commands and unrolling the transfer requests for each DMA command in order to improve the system performance.

Therefore, there is a need for optimizing the process of handling such DMA commands in a computer system using a DMA mechanism.

SUMMARY OF THE INVENTION

The present invention provides a method and an apparatus for handling a list DMA command in a computer system having at least one processor and a system memory. The list DMA command relates to an effective address (EA) of the system memory. The at least one processor has a local storage. The list DMA command is queued in a DMA queue (DMAQ). The list DMA command comprises a first portion of the EA. A list element is fetched from the local storage to the DMAQ. The list element comprises a second portion of the EA. The list DMA command is read from the DMAQ. A bus request is issued for the list element. It is determined whether the bus request is a last request. If the bus request is a last request, it is determined whether a current list element is a last list element. If the current list element is not the last list element, it is determined whether the current list element is fenced. If the current list element is not fenced, a next list element is fetched regardless of whether all outstanding requests are completed.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless indicated otherwise.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
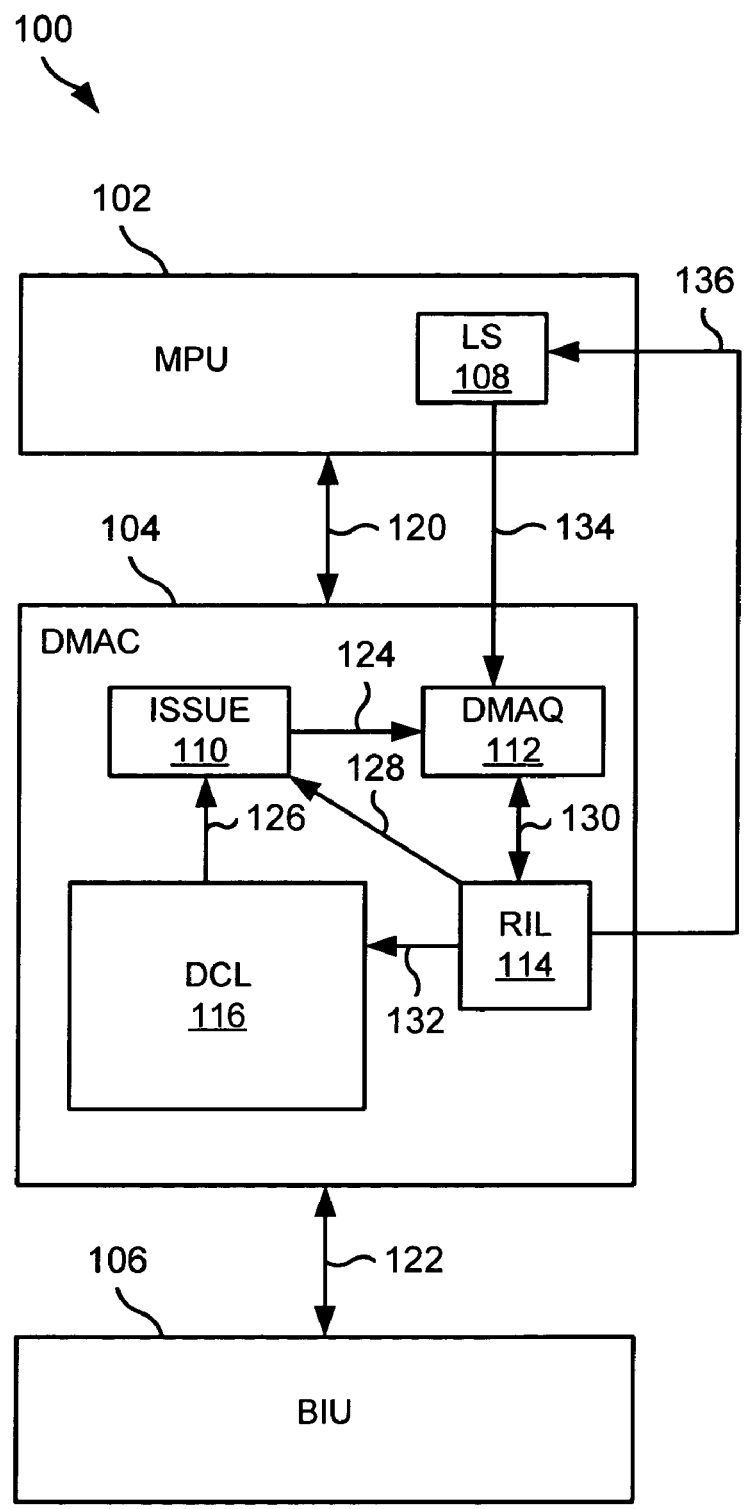
FIG. 1 depicts a block diagram illustrating a computer system for optimizing a process of handling DMA commands.

Now referring to FIG. 1 of the drawings, the reference numeral 100 generally designates a block diagram illustrating a portion of a computer system related to direct memory access (DMA) transfers. The block diagram 100 comprises a main processing unit (MPU) 102, a direct memory access controller (DMAC) 104, and a bus interface unit 106. The MPU 102 includes a local storage (LS) 108. The DMAC 104 includes an issue logic 110, a DMA command queue (DMAQ) 112, a request interface logic (RIL) 114, and a DMA completion logic (DCL) 116. The MPU 102 is coupled to the DMAC 104 via a connection 120. The DMAC 104 is coupled to the bus interface unit 106 via a connection 122. Specifically, the issue logic 110 is coupled to the DMAQ 112, the DCL 116, and the RIL 114 via connections 124, 126, and 128, respectively. The RIL 114 is coupled to the DMAQ 112 and the DCL 116 via connections 130 and 132, respectively. The LS 108 is directly coupled to both the DMAQ 112 and the RIL 114 via connections 134 and 136, respectively.

A DMA command preferably initiates a DMA data transfer between the LS 108 and a system memory coupled to the BIU. A list DMA command is a chain of normal DMA commands. Therefore, each list element of a list DMA command is a DMA command. In general, a single DMA command can be broken up into multiple requests out to a bus in a computer system. Therefore, in the case of a list DMA command having a plurality of list elements, each list element can be broken up into multiple requests out to a bus.

List DMA commands can either be fenced or non-fenced depending on a stall bit. If a list element is fenced via the stall bit, the hardware must wait until all completions from the bus have come back. When the last completion is seen, the stall condition is sent to the MPU 102 via the connection 120. After the stall is acknowledged at a later time, the next list element can be processed. However, if the list element is not fenced (i.e., no stall condition), the hardware should not have to wait for the bus completions to finish.

The issue logic 110 is coupled to the DMAQ 112 for issuing an issue request to the DMAQ 112 via the connection 124. The issue logic 110 is also coupled to the DCL 116 for receiving a stall notification from the DCL 116 via the connection 126. The issue logic 110 is also concerned with an issue policy to issue the DMA command out of the DMAQ 112. The issue policy includes issue dependency among different DMA command.

The DMAC 104 also has other logic blocks such as the DMAQ 112, RIL 114, and DCL 116. The DMAQ 112 is configured for storing the DMA command received from the MPU 102 via the connection 120. The DMAQ 112 is coupled to the issue logic 110 for receiving an issue request via the connection 124. The request interface logic (RIL) 114 is coupled to the DMAQ 112, the issue logic 110, and the DCL 116. The RIL 114 is generally configured for processing (i.e., unrolling) at least one unroll request of the DMA command.

The relationship between the MPU 102 and the DMAC 104 is defined as follows. The MPU 102 generates a DMA command, which is transferred to the DMAC 104 via the connection 120. The transferred DMA command is queued at the DMAQ 112 via the connection 120. Preferably, the DMA command includes information as to the properties of the DMA command such as whether the DMA command is a list DMA command. In the case of a list DMA command, the information may also include general information on the list elements included in the list DMA command. For example, these properties may include a list transfer size (LTS; i.e., the number of list elements within a list DMA command), effective address low (EAL), a local storage address (LSA), and a list element address (LTA).

Given that a DMA command relates to a portion of a system memory (not shown), the portion of a system memory has a real address (RA). Typically, the MPU 102 does not use the RA, but uses a mapped address such as an effective address (EA). Therefore, a list DMA command includes effective address high (EAH).

Preferably, a list DMA command comprises at least a portion of an effective address (EA), the LSA, a list transfer size (LTS), and a list element address (LTA). Preferably, the portion of the EA is the EAH. The translation of an EA to a corresponding RA may be performed in a memory management unit (MMU) (not shown), which may be located between the DMAC 104 and the BIU 122. In a preferred embodiment of the present invention, the EA consists of effective address low (EAL) and effective address high (EAH). For example, if the EA is 64 bits, then the EAH and EAL may be 32 bits each. Thus, the EAH is the upper 32 bits of the 64-bit EA, whereas the EAL is the lower 32 bits of the 64-bit EA. In this example, the list DMA command includes the EAH, whereas each list element of the list DMA command includes the EAL.

Each list element that is stored in the local storage 108 also includes other information such as a transfer size (TS) and a stall bit. The TS indicates the size of each list element in terms of the number of transfer requests to be issued to the BIU 106 when the list element is unrolled. Thus, if unrolling a list element requires 128 transfer requests to the BIU 106, then TS is 128 for this list element. The stall bit indicates whether the list element is fenced or non-fenced. If it is fenced, then the stall bit is set. If it is not fenced, then the stall bit is reset.

The list element of the list DMA command is fetched from the local storage 108 and is stored in the DMAQ 112. Preferably, the list element is stored in the DMAQ entry containing the list DMA command. Preferably, the issue logic 110 accesses the DMAQ 112 to retrieve a DMA command from the DMAQ 112 via the connection 124. This retrieved DMA command is then provided to the RIL 114 via the connection 130. Then, the RIL 114 unrolls the DMA command and forwards the unrolled request to the BIU 106 via the connection 122. The unrolling process in this context comprises (1) forwarding a request to the BIU 106; (2) calculating the next addresses (for both LSA and EA) and decrementing the transfer size; and (3) writing back the next addresses to the DMAQ 112 via the connection 130.

As mentioned above, this process involves "unrolling" one request at a time to the bus interface unit 106. As mentioned above, when the DMA command is initially fetched from the LS 108 and queued in the DMAQ 112, the DMA command has information as to whether the DMA command is a list DMA command or a non-list DMA command (i.e., a normal DMA command). In the case of a non-list DMA command, the DMA command is treated as a normal DMA command.

When a list DMA command is first queued in the DMAQ 112, it will not have a complete effective address (EA), transfer size (TS), or stall fields. Thus, when the list DMA command first pops out of the DMAQ 112 (i.e., when the issue logic 110 reads the list DMA command from the DMAQ 112), the RIL 114 receives a condition that the DMA command is a list DMA command and no list element has yet to be fetched. Preferably, this condition is indicated by the EA valid bit=0 and list valid bit=1. The RIL 114 will trigger on this condition and fetch a first list element specified by a list element address (LTA). After the fetch is completed for the first list element, that element essentially looks just like a normal DMA command. When it is issued later, then the EA will be valid and it proceeds normally as a request to the bus.

In the case of a list DMA command, the list DMA command that was initially queued in the DMAQ 112 is read out to the RIL 114 via the connection 130. The list DMA command includes information as to whether the EAL is valid (i.e., whether there is a list element queued in the DMAQ 112). Since no list element has yet to be fetched from the LS 108, the EAL should be invalid at this time. Preferably, this information is shown in the "EA_valid" bit. If the EA_valid bit is 0, the EAL is invalid. If the EA_valid is 1, then the EAL is valid. Since the EAL is invalid, the RIL 114 sends a request to the LS 108 via the connection 136 to initiate a fetch of a list element from the LS 108 to the DMAQ 112 via the connection 134. Specifically, the list element comprises at least an EAL, TS, and a stall bit.

The RIL 114 then issues a transfer request (also known as a bus request) from this list element. A list element generally comprises a plurality of such requests. For example, a list element may have 128 bus requests. The unrolling process of RIL 114 includes issuing one bus request for this list element read from DMAQ 112. The unrolling process also includes calculating the next address (for both LSA and EA), decrementing the transfer size, and writing back the next address to the DMAQ 112 via the connection 130.

Preferably, the RIL 114 may include a "last" bit indicating whether the current request being issued to the BIU 106 is the last request for the current list element. For example, if the "last" bit is set, it indicates that the current request is the last request.

When the request being currently issued is not the last request, the EA and the local storage address (LSA) each are incremented to the next address, and the TS is decremented. When the request currently being issued is the last request, the LTS is decremented by one, whereas the LSA is still incremented to the next address.

In the case of the last request, the RIL 114 checks the stall bit to see if the list element currently being unrolled at the RIL 114 is fenced or non-fenced. If the stall bit is not set (i.e., if the current list element is non-fenced), then the RIL 114 sends a fetch request to the MPU 102 so that a next list element can be fetched from the LS 108 and stored in the DMAQ 112. This fetching process occurs regardless and independently of the bus completion process of the prior list element.

By contrast, if the stall bit is set (i.e., if the current list element is fenced), then the RIL 114 notifies both the issue logic 110 and the DCL 116 that the stall bit is set. The DCL 116 takes this notification and waits until all outstanding requests are completed for the current list element. Once they are completed, the DCL 116 sends both the MPU 102 and the issue logic a stall notification, which indicates that all outstanding requests are completed. In response, the MPU 102 sends a stall acknowledgement back to the issue logic 110 and the DCL 116. The stall acknowledgement indicates that the next list element can be fetched from the LS 108. In the case of a fenced list element, the RIL 114 also writes back EA_valid=0 to the DMAQ 112. Only after the issue logic 110 receives the stall acknowledgement signal from the MPU 102 is a next list element allowed to be fetched from the LS 108. As the non-fenced case, the LSA is incremented to the next address, and the LTS is decremented by one.

It is noted here that the present invention may be implemented in a computer system further including additional processor(s) without departing from the spirit of the present invention. For example, such additional processor(s) may be coupled to the DMAC 104.

Figure 2:
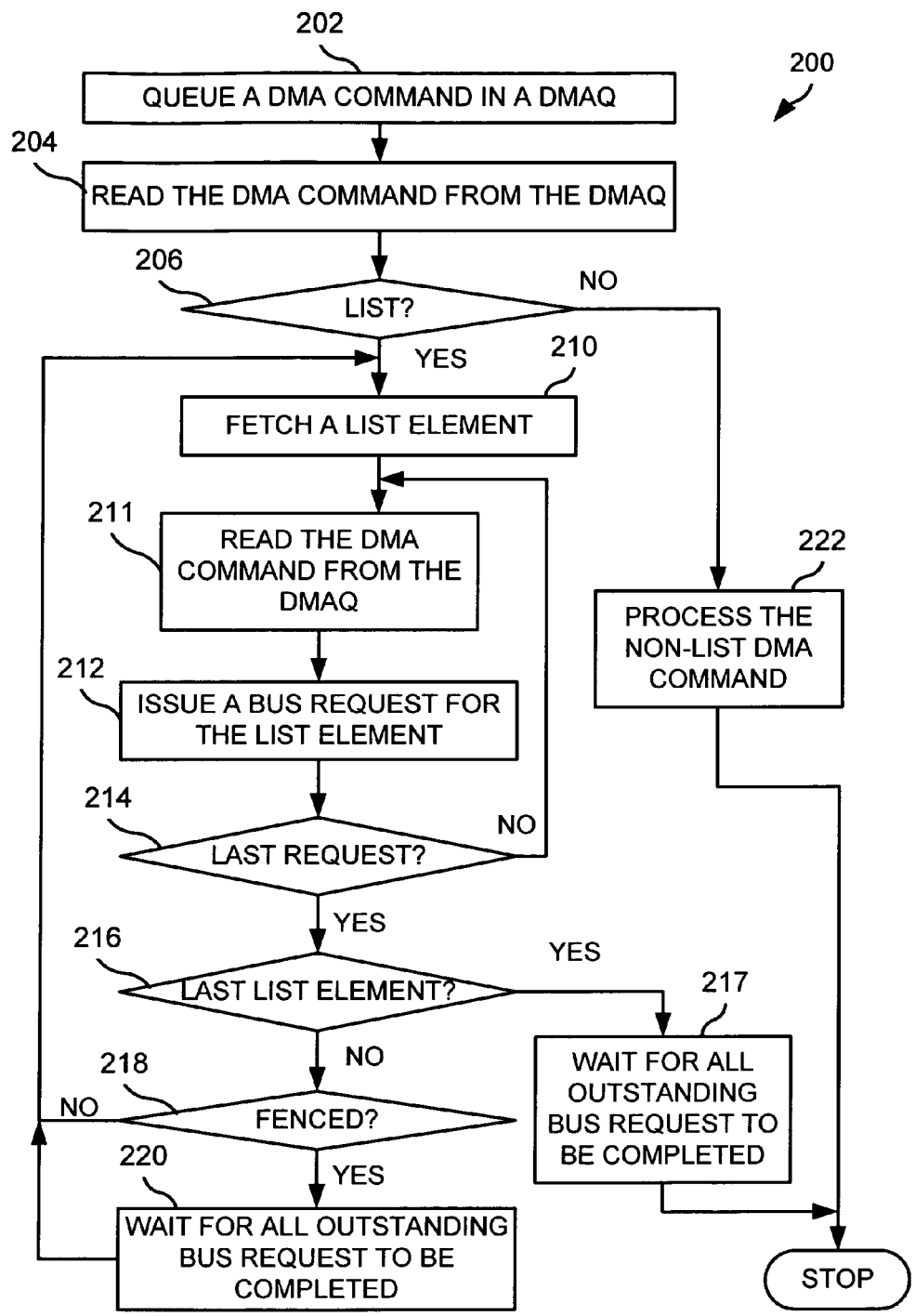
FIG. 2 depicts a flow diagram illustrating a process of handling DMA commands in a computer system of FIG. 1.

Now referring to FIG. 2, a flow diagram 200 illustrates a flow diagram illustrating a process of handling DMA commands in a computer system of FIG. 1.

In step 202, the list DMA command is queued in a DMA queue (DMAQ). In step 206, it is determined whether the DMA command is a list DMA command. If it is a list DMA command, then the process continues to step 210, where a list element is fetched. In step 211, the DMA command is read from the DMAQ. In step 212, a bus request is issued for the list element. In step 214, it is determined whether the current request is the last request in the current list element. If the current request is not the last request in the current list element, the process returns to step 211. If the current request is the last request in the current list element, the process goes to step 216, where it is further determined whether the current list element is the last list element. If the current list element is the last list element, the process proceeds to step 217, where the computer system waits for all outstanding bus requests to be completed. Subsequently, the process terminates.

If in step 216 the current list element is not the last list element, the process goes to step 218, where it is determined whether the current list element is fenced. If it is not fenced, the process returns to step 210, where a next list element is fetched regardless of whether all outstanding requests are completed. If in step 218 the current list element is fenced, the process continues to step 220, where the computer system waits for all outstanding bus requests to be completed and then returns to step 210 to fetch a next list element.

If in step 206 it is a non-list DMA command, then the process continues to step 222, where the non-list DMA command is processed in a normal fashion and the process terminates subsequently.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for handling a list DMA command in a computer system having at least one processor and a system memory, the list DMA command relating to an effective address (EA) of the system memory, and the at least one processor having a local storage, the method comprising the steps of:
   queuing the list DMA command in a DMA queue (DMAQ), wherein the list DMA command comprises a first portion of the EA;
   fetching a list element from the local storage to the DMAQ, wherein the list element comprises a second portion of the EA;
   reading the list DMA command from the DMAQ;
   issuing a bus request for the list element;
   determining whether the bus request is a last request;
   upon a determination that the bus request is a last request, determining whether a current list element is a last list element;
   upon a determination that the current list element is not the last list element, determining whether the current list element is fenced; and
   upon a determination that the current list element is not fenced, fetching a next list element regardless of whether all outstanding requests are completed.

2. The method of claim 1, wherein the list DMA command further comprises a local storage address (LSA) and a list transfer size (LTS).

3. The method of claim 1, wherein the list element further comprises a transfer size (TS) and a stall bit.

4. The method of claim 1, further her comprising the step of reading the list DMA command from the DMAQ.

5. The method of claim 1, further comprising the step of, upon a determination that the bus request is not a last request, reading the list DMA command from the DMAQ and issuing another bus request for the list element.

6. The method of claim 1, wherein the current list element is fenced, the method further her comprising the steps of:
   waiting for all outstanding requests to be completed;
   upon the completion of all outstanding requests, sending a stall notification to the at least one processor to notify the at least one processor of the completion;
   receiving from the at least one processor a stall acknowledgement that a next list element can be fetched; and
   fetching the next list element.

7. An apparatus for handling a list DMA command in a computer system having at least one processor and a system memory, the list DMA command relating to an effective address (EA) of the system memory, and the at least one processor having a local storage, the apparatus comprising:
   means for queuing the list DMA command in a DMA queue (DMAQ), wherein the list DMA command comprises a first portion of the EA;
   means for fetching a list element from the local storage to the DMAQ, wherein the list element comprises a second portion of the EA;

means for reading the list DMA command from the DMAQ;

means for issuing a bus request for the list element;

means for determining whether the bus request is a last request;

means for, upon a determination that the bus request is a last request, determining whether a current list element is a last list element;

means for, upon a determination that the current list element is not the last list element, determining whether the current list element is fenced; and means for, upon a determination that the current list element is not fenced, fetching a next list element regardless of whether all outstanding requests are completed.

8. The apparatus of claim 7, wherein the list DMA command further comprises a local storage address (LSA) and a list transfer size (LTS).

9. The apparatus of claim 7, wherein the list element further comprises a transfer size (TS) and a stall bit.

10. The apparatus of claim 7, further comprising means for reading the list DMA command from the DMAQ.

11. The apparatus of claim 7, further comprising means for, upon a determination that the bus request is not a last request, reading the list DMA command from the DMAQ and issuing another bus request for the list element.

12. The apparatus of claim 7, wherein the current list element is fenced, the apparatus further comprising:

means for waiting for all outstanding requests to be completed;

means for, upon the completion of all outstanding requests, sending a stall notification to the at least one processor to notify the at least one processor of the completion;

means for receiving from the at least one processor a stall acknowledgement that a next list element can be fetched; and means for fetching the next list element.

13. A computer program product for handling a list DMA command in a computer system having at least one processor and a system memory, the list DMA command relating to an effective address (EA) of the system memory, and the at least one processor having a local storage, the computer program product having a medium with a computer program embodied thereon, the computer program comprising:

computer program code for queuing the list DMA command in a DMA queue (DMAQ), wherein the list DMA command comprises a first portion of the EA;

computer program code for fetching a list element from the local storage to the DMAQ, wherein the list element comprises a second portion of the EA;

computer program code for reading the list DMA command from the DMAQ;

computer program code for issuing a bus request for the list element;

computer program code for determining whether the bus request is a last request;

computer program code for, upon a determination that the bus request is a last request, determining whether a current list element is a last list element;

computer program code for, upon a determination that the current list element is not the last list element, determining whether the current list element is fenced; and computer program code for, upon a determination that the current list element is not fenced, fetching a next list element regardless of whether all outstanding requests are completed.

14. The computer program product of claim 13, wherein the list DMA command further her comprises a local storage address (LSA) and a list transfer size (LTS).

15. The computer program product of claim 13, wherein the list element further comprises a transfer size (TS) and a stall bit.

16. The computer program product of claim 13, the computer program further comprising computer program code for reading the list DMA command from the DMAQ.

17. The computer program product of claim 13, the computer program further comprising computer program code for, upon a determination that the bus request is not a last request, reading the list DMA command from the DMAQ and issuing another bus request for the list element.

18. The computer program product of claim 13, wherein the current list element is fenced, the computer program farther comprising:

computer program code for waiting for all outstanding requests to be completed;

computer program code for, upon the completion of all outstanding requests, sending a stall notification to the at least one processor to notify the at least one processor of the completion;

computer program code for receiving from the at least one processor a stall acknowledgement that a next list element can be fetched; and computer program code for fetching the next list element.

* * * * *